United States Patent [19]
Nishibayashi et al.

[11] Patent Number: 5,994,665
[45] Date of Patent: Nov. 30, 1999

[54] METHOD OF CONTINUOUS HOT ROLLING AND APPARATUS FOR WELDING STEEL BARS THEREOF

[75] Inventors: Shigeru Nishibayashi; Masahiro Ohara, both of Futtsu; Katsuhiro Minamida, Sagamihara; Tadatsugu Yoshida; Rokuro Kohno, both of Futtsu; Atsushi Sugihashi, Sagamihara, all of Japan

[73] Assignee: Nippon Steel Corporation, Tokyo, Japan

[21] Appl. No.: 09/092,292

[22] Filed: Jun. 5, 1998

Related U.S. Application Data

[62] Continuation of application No. 08/751,284, Nov. 18, 1996, Pat. No. 5,814,787, which is a continuation of application No. 08/307,733, filed as application No. PCT/JP94/00127, Jan. 28, 1994, abandoned.

[30] Foreign Application Priority Data

| Jan. 28, 1993 | [JP] | Japan | 5-12471 |
| Mar. 31, 1993 | [JP] | Japan | 5-74335 |
| Sep. 22, 1993 | [JP] | Japan | 5-236912 |

[51] Int. Cl.⁶ .......................... B23K 26/02; B23K 26/08; B21B 1/26; B21B 15/00
[52] U.S. Cl. ................. 219/121.64; 219/121.8; 219/121.82; 219/121.83; 228/5.7; 228/26
[58] Field of Search ................ 219/101–104, 219/121.63, 121.64, 121.8, 121.82, 121.83; 72/234, 203; 228/5.7, 26

[56] References Cited

U.S. PATENT DOCUMENTS

| 4,294,394 | 10/1981 | Iida et al. | 228/5.7 |
| 4,377,735 | 3/1983 | Minamida et al. | 219/121.63 |
| 4,623,777 | 11/1986 | Aihara et al. | 219/121.63 |
| 4,626,651 | 12/1986 | Tanaguchi et al. | 219/121.63 |

(List continued on next page.)

FOREIGN PATENT DOCUMENTS

| 0 492 368 | 7/1992 | European Pat. Off. . | |
| 0 495 989 | 7/1992 | European Pat. Off. . | |
| 3626974 | 2/1988 | Germany | 219/121.64 |
| 54-139848 | 10/1979 | Japan . | |
| 57-31489 | 2/1982 | Japan . | |
| 58-134285 | 9/1983 | Japan . | |
| 60-24201 | 2/1985 | Japan . | |
| 60-121089 | 6/1985 | Japan . | |
| 61-126983 | 6/1986 | Japan . | |
| 3-81079 | 4/1991 | Japan . | |
| 4-89109 | 3/1992 | Japan . | |
| 57-109504 | 7/1992 | Japan . | |
| 5-23707 | 2/1993 | Japan . | |
| 59-137105 | 8/1994 | Japan . | |

*Primary Examiner*—Joseph Pelham
*Attorney, Agent, or Firm*—Kenyon & Kenyon

[57] ABSTRACT

Sheet bars are effectively joined while they are traveling and subjected to continuous hot rolling without causing defects in quality and without requiring large expensive apparatus such as a swing roller etc.

The present invention is to provide a continuous hot rolling method and apparatus in which the tail of a preceding sheet bar is butted to the top of a succeeding sheet bar between the rough and finishing mills on a continuous hot rolling line, and the butted portion is welded from the upper surface of the sheet bars by means of laser beam or plasma arc while the sheet bars are traveling.

According to the present invention, it is possible to join sheet bars from the upper surface in a short period of time without stopping the sheet bars and without causing splashes and burrs, before the sheet bars are subjected to continuous finish rolling. Since the welded apparatus does not interfere with the sheet bar conveyance table, hot strips of high quality can be effectively manufactured by the economical apparatus.

12 Claims, 13 Drawing Sheets

U.S. PATENT DOCUMENTS

| | | | |
|---|---|---|---|
| 4,711,114 | 12/1987 | Rohde et al. | 72/234 |
| 4,850,522 | 7/1989 | Nichols | 228/159 |
| 4,854,493 | 8/1989 | Fujii et al. | 228/5.7 |
| 5,121,873 | 6/1992 | Sekiya et al. | 228/5.7 |
| 5,172,846 | 12/1992 | Hayashi et al. | 228/5.7 |
| 5,219,114 | 6/1993 | Kajiwara et al. | 228/158 |
| 5,222,654 | 6/1993 | Oki et al. | 228/220 |
| 5,229,571 | 7/1993 | Neiheisel | 219/121.63 |
| 5,245,156 | 9/1993 | Kamagawa et al. | 219/121.64 |
| 5,323,951 | 6/1994 | Takechi et al. | 72/203 |
| 5,435,164 | 7/1995 | Giusto et al. | 72/234 |

PLATE THICKNESS   PLATE THICKNESS

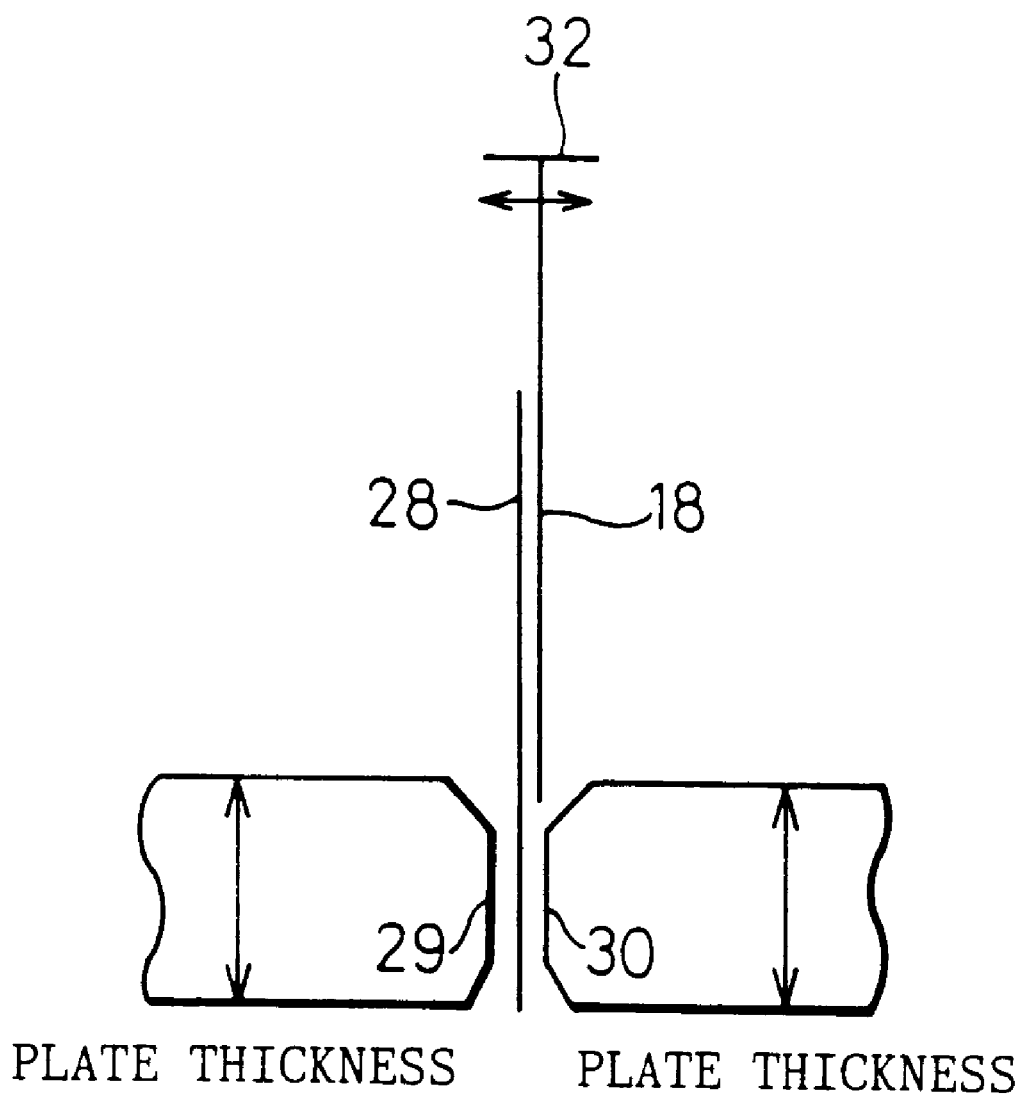

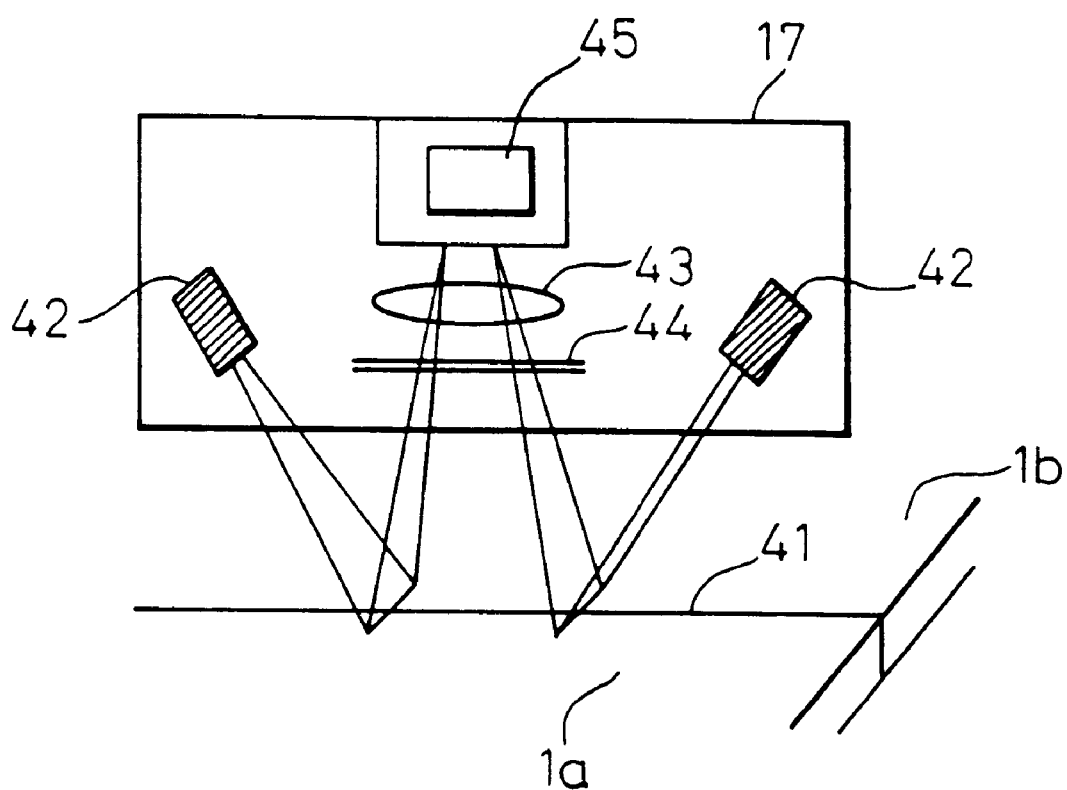

METHOD OF CONTINUOUS HOT ROLLING AND APPARATUS FOR WELDING STEEL BARS THEREOF

This application is a continuation application under 35 C.F.R. §1.53(b) of prior application Ser. No. 08/751,284 filed Nov. 18, 1996 now U.S. Pat. No. 5,814,787, which is a continuation of application Ser. No. 08/307,733 filed Sep. 23, 1994 (now abandoned) which is a 35 U.S.C. §371 of PCT/JP94/00127 filed Jan. 28, 1994. The disclosure of the specification, drawings and abstract of application Serial Nos. 08/307,733 and 08/751,284 is incorporated herein by reference.

TECHNICAL FIELD OF THE INVENTION

The present invention relates to a method of continuous hot rolling for manufacturing hot strips when sheet bars are continuously hot-rolled, and more particularly relates to a method of rolling sheet bars continuously and an apparatus for welding sheet bars by which the sheet bars are joined while the welding apparatus is traveling at a rolling speed.

DESCRIPTION OF THE PRIOR ART

Conventionally, in a hot rolling line, after slabs have been heated in a heating furnace, they are extracted from the heating furnace one by one and subjected to rough and finish rolling intermittently. Therefore, it is difficult to provide a product, the quality of which is uniform from the top to the tail of the product. Further, it is impossible to raise the rolling speed until the top of a strip reaches the coiler. According to the conventional method and apparatus, the above problems are encountered in view of quality and productivity. In order to solve the above problems, a large number of proposals have been made recently for hot-rolling sheet bars continuously in such a manner that the tail of a preceding sheet bar and the top of a succeeding sheet bar are butted and welded while they are traveling and the welded sheet bars are continuously rolled.

In this hot rolling method, the following conditions must be satisfied.

(1) Defects in quality such as scale pressed marks are not caused.

(2) Since the sheet bars are subjected to continuous hot rolling, the preceding and succeeding sheet bars must be joined in a short period of time without being stopped.

(3) It is preferable that an apparatus to be introduced for welding sheet bars is not large so that the apparatus can be easily added to an established hot rolling line.

On the other hand, there is a good possibility that defects in quality are caused by the conventional continuous hot rolling method, so that it is difficult to put the conventional continuous hot rolling method into practical use. For example, the prior art in this field is disclosed in Japanese Unexamined Patent Publication No. 60-24201 in which the sheet bars are joined by means of thermit welding. However, this method is disadvantageous in that the splashes and burrs caused in the process of welding sheet bars are peeled off from the sheet bars in the successive rolling process, so that the rollers are damaged and defects are caused on the surface of a strip. Further, in the process of thermit welding, a long period of time is required for melting and cooling, and it takes time to join the sheet bars.

A large number of methods are disclosed in which the tail of a preceding sheet bar and the top of a succeeding sheet bar are heated and butted to each other with pressure so that the preceding and succeeding sheet bars are welded.

With respect to this continuous rolling method, Japanese Unexamined Patent Publication No. 61-126983 discloses a method in which the end surfaces to be joined are simultaneously heated by a hot scarfer and butted to each other, and then the sheet bars are rolled. Further, Japanese Unexamined Patent Publication No. 4-89109 discloses a method in which the end surfaces to be joined are contacted with each other and a magnetic field is impressed for heating upon the contact region in a direction of the thickness of the sheet bar, so that the sheet bars are joined with pressure. However, according to the above welding method in which the sheet bars are required to be pushed to each other, in general, the required pushing force is high, that is, the required pushing force is not less than 3 kgf/mm$^2$ when it is converted into surface pressure. In order to generate this high pushing force, a high clamping force is required because the pushing force is determined by a frictional force applied between the sheet bar and the clamper. For this reason, problems may be encountered, in which scale is pressed onto the surface of the sheet bar so that defects are caused on the surface of the product.

In order to solve the above problems, it is necessary to provide a descaling unit using water of high pressure on an entry side of the clamper, however, it raises the cost of the apparatus, and when the sheet bars are subjected to descaling of high pressure water, the temperatures of the sheet bars are lowered and energy loss is increased. In addition to that, according to the methods in which the sheet bars are pushed to each other so as to be joined, pushed portions of the sheet bars to be joined are deformed and the thickness of the pushed portion is increased so that burrs are caused. Therefore, this deformed portion becomes a "hege" defect in the successive process of hot rolling. In the case where this deformed portion has been peeled off from the sheet bar, rollers of the mill are damaged, so that defects are caused on the surface of the product. Consequently, in order to remove the burrs, it is necessary to provide a grinding machine, so that the construction of the apparatus becomes more complicated and expensive.

According to the conventional continuous rolling method disclosed in Japanese Unexamined Patent Publication No. 57-109504 in which the preceding and succeeding sheet bars are joined without being stopped, the sheet bars are clamped and welded while they are traveling. In this case, it is necessary to employ a group of swing rollers so as to avoid interference with the apparatus. Especially, in the case where an established rolling mill is remodeled to a continuous rolling mill, the foundation must be greatly changed for adopting the swing rollers. Therefore, the equipment expenditures are greatly increased, and the mill must be stopped over a long period of time during the construction.

SUMMARY OF THE INVENTION

Instead of the conventional continuous hot rolling method having a large number of problems as described above, the present invention is to provide a continuous hot rolling method by which traveling sheet bars are effectively welded in a short period of time without causing problems in quality such as scale marks and "hege" defects and also without introducing large and expensive apparatus such as swing rollers.

The summary of the invention will be described as follows.

(1) A continuous hot rolling method in which the tail of a preceding sheet bar and the top of a succeeding sheet bar are butted and welded and then the welded sheet bars are continuously rolled, comprising the step of: conducting a melting welding operation on the butted portion from upper surfaces of the sheet bars using laser beams or plasma arcs, wherein the melting welding operation is conducted while the welding machine is traveling by itself at the same speed as that of the sheet bars.

(2) The continuous hot rolling method according to item (1), the method further comprising the steps of: holding the sheet bars by at least 2 pairs of pinch rollers disposed between a flying shear for cutting an end of the sheet bar and the hot rolling mill; and holding the preceding and succeeding sheet bars independently at a center of the rolling mill by a hydraulic side guide disposed between the pairs of pinch rollers.

(3) The continuous hot rolling method according to item (1), the method further comprising the step of: butting the preceding and succeeding sheet bars while the side of the tail of the preceding sheet bar and the side of the top of the succeeding sheet bar are respectively clamped by a damper connected with a pushing device, the damper being disposed between a flying shear for cutting an end of the sheet bar and the rolling mill, the clamping operation being conducted from the upper side of the sheet bar, the butting operation being conducted at the same speed as that of the sheet bar.

(4) The continuous hot rolling method according to item 1, the method further comprising the step of: butting the preceding and succeeding sheet bars while the upper and lower surfaces of the tail of the preceding sheet bar and the top of the succeeding sheet bar are respectively clamped by a clamper connected with a pushing device, the damper being disposed between the flying shear for cutting an end of the sheet bar and the rolling mill, the butting operation being conducted at the same speed as that of the sheet bar.

(5) The continuous hot rolling method according to one of items (1) to (4), the method further comprising the step of: preliminarily forming one of or both of the tail of the preceding sheet bar and the top of the succeeding sheet bar before the sheet bars are butted so that a gap formed in the butted portion can be reduced, wherein the preliminary formation is conducted from an upper surface of the sheet bar by means of laser beam scarfing or cutting at the same speed as that of the sheet bar.

(6) The continuous hot rolling method according to one of items (1) to (5), the method further comprising the steps of: welding the sheet bars at both end portions with respect to the width of the sheet bars, a sectional area of the welding portion on one side being not less than 3% of a sectional area of the sheet bar; and joining the not-welded portion with pressure by the first roller stand of the mill.

(7) The continuous hot rolling method according to one of items (1) to (6), the method further comprising the step of: determining the welding length in the width direction of the sheet bar from the effective thickness of the butted portion of which the surfaces are formed by means of shear cutting or laser beam cutting.

(8) The continuous hot rolling method according to one of items (1) to (7), the method further comprising the step of: determining a welding speed of the sheet bar from the temperature of the sheet bar, laser beam output, and targeted welding plate thickness.

(9) The continuous hot rolling method according to one of items (1) to (8), the method further comprising the step of: simultaneously irradiating a plurality of laser beams on both the tail of a preceding sheet bar and the top of a succeeding sheet bar so as to melt them for enhancing the dimensional accuracy of the butted portion.

(10) A continuous hot-rolled sheet bar welding apparatus by which the tail of a preceding sheet bar and the top of a succeeding sheet bar are butted and welded, comprising: a movable main body traveling device capable of traveling by itself being opposed to a fixed laser beam source, the movable main body traveling device including a rolling direction movable reflecting mirror, a vertical direction movable reflecting mirror, a width direction condenser and a welding section copying device, wherein the welding apparatus detects a welding position of the sheet bars using the welding section copying device while the welding apparatus travels by itself.

(11) A continuous hot-rolled sheet bar welding apparatus by which the tail of a preceding sheet bar and the top of a succeeding sheet bar are butted and welded, comprising: at least 2 pairs of pinch rollers; a hydraulic side guide provided between the pairs of pinch rollers, the hydraulic side guide independently holding the preceding and succeeding sheet bars at a center of the rolling mill; and a welding device traveling at the same speed as that of the sheet bars.

(12) A continuous hot-rolled sheet bar welding apparatus by which the tail of a preceding sheet bar and the top of a succeeding sheet bar are butted and welded, comprising: a damper for clamping the sides of the tail of the preceding sheet bar and the sides of the top of the succeeding sheet bar from the upper surface of the sheet bar; a pushing device connected with the clamper; a speed synchronizing device for synchronizing the speed with that of the sheet bars; and a welding apparatus traveling by itself at the same speed as that of the sheet bar.

(13) A continuous hot-rolled sheet bar welding apparatus by which the tail of a preceding sheet bar and the top of a succeeding sheet bar are butted and welded, comprising: a clamper for clamping the upper and lower surfaces of the tail of the preceding sheet bar and the upper and lower surfaces of the top of the succeeding sheet bar; a pushing device connected with the clamper; a speed synchronizing device for synchronizing the speed with that of the sheet bars; and a welding apparatus traveling by itself at the same speed as that of the sheet bar.

(14) The continuous hot-rolled sheet bar welding apparatus according to one of items (11) to (13), wherein the welding apparatus uses laser beams.

(15) The continuous hot-rolled sheet bar welding apparatus according to one of items (10) to (13), wherein the welding apparatus is of a laser beam type, the welding apparatus includes two pairs of laser processing heads so that both sides of the sheet bar can be simultaneously cut and welded by laser beams, or one side and the center can be simultaneously cut and welded by laser beams.

(16) The continuous hot-rolled sheet bar welding apparatus according to one of items (10) to (15), wherein the welding apparatus is of a laser beam type, and the laser beams are oscillated so that the allowable range of butting accuracy can be increased.

(17) The continuous hot-rolled sheet bar welding apparatus according to one of items (10) to (16), wherein the continuous hot-rolled sheet bar welding apparatus recognizes the configuration of the welded portion, the continuous hotrolled sheet bar welding apparatus further comprising: a semiconductor laser beam oscillator; a band-pass filter of which the width is several nm with respect to the wavelength of the semiconductor laser beam; and a welded portion copying device composed of a condenser lens and a CCD.

BRIEF DESCRIPTION OF THE DRAWINGS

FIGS. 3(a) and 3(b) are views showing an example of the edge profile of the sheet bar relating to the present invention, wherein FIG. 3(a) is a view showing the edge profile of a butted sheet bar, and FIG. 3(b) is a view showing the edge profile after laser cutting.

FIGS. 8(a), 8(b) and 8(c) are views showing a sheet bar follow-up method of the flying laser beam welding apparatus to which the present invention is applied, wherein FIG. 8(a) is an arrangement view showing an outline of the appropriate construction, FIG. 8(b) is a sectional view taken on line A—A, and FIG. 8(c) is a view taken from line B—B.

Fig. 11 is a schematic illustration of the vibration system of a laser beam welding to which the present invention is applied.

FIGS. 12(a) and 12(b) are schematic illustrations of the pushing device including the side damper to which the present invention is applied, wherein FIG. 12(a) is a perspective view and FIG. 12(b) is a front view.

FIGS. 13(a) and 13(b) are schematic illustrations of the pushing device including the upper and lower dampers to which the present invention is applied, wherein FIG. 13(a) is a side view and FIG. 13(b) is a front view.

FIG. 14 is a schematic illustration of the welding portion copying device to which the present invention is applied.

MOST PREFERRED EMBODIMENT OF THE INVENTION

In the present invention, a laser beam or plasma arc type melting welding method is used for joining a preceding and a succeeding sheet bar. Therefore, it is not necessary to apply a high welding pressure to the welding portion as in a pressure-welding system, and it is sufficient to position the preceding and the succeeding sheet bars with a normal welding pressure. In this way, problems in quality can be solved. Further, in the melting welding method, only a welding portion is locally melted, so that the occurrence of splashes can be avoided, and welding operation can be highly effectively conducted and welding time can be reduced. Further, the length of the apparatus can be shortened.

With reference to the accompanying drawings, the present invention will be explained in detail.

Figure 1:
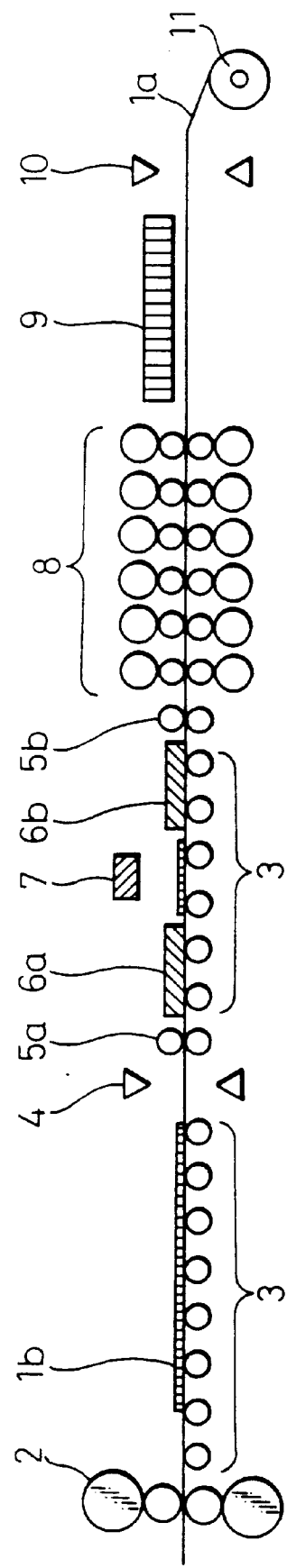
FIG. 1 is an arrangement view showing an outline of the example of the continuous hot rolling line according to the resent invention.

FIG. 1 is a schematic illustration showing an example of the joining apparatus, according to the present invention, which is applied to an actual continuous hot rolling line. The continuous hot rolling line shown in FIG. 1 is arranged in the following manner. After a slab, heated by a heating furnace, has been rolled by a roughing mill 2, the top and tail of the sheet bar traveling on a conveyance table 3 are cut off by a flying shear 4. Before the sheet bar enters a group of finishing mills 8, there are provided pinch rollers 5a, 5b for butting a preceding sheet bar 1a and a succeeding sheet bar 1b, and hydraulic side guides 6a, 6b having rotational rollers for guiding the sheet bar in the width direction. Further, there is provided a laser cutting and welding apparatus 7 which moves at the same speed as the sheet bar.

While the preceding sheet bar 1a, subjected to finish-rolling by the group of finishing mills 8, is being guided by in the width direction by the hydraulic guides 6a, 6b having rotational rollers, the tail of the preceding sheet bar 1a is cut off by the flying shear 4, so that the shape of the end of the sheet bar is regulated. After that, the top of the succeeding sheet bar 1b is cut off by the flying shear 4 while the succeeding sheet bar 1b is being guided for centering by common side guides, so that the shape of the top of the succeeding sheet bar 1b is regulated. Then the succeeding sheet bar 1b is moved by the pinch roller 5a so that the top of the succeeding sheet bar 1b is butted against the tail of the preceding sheet bar.

Figure 2:
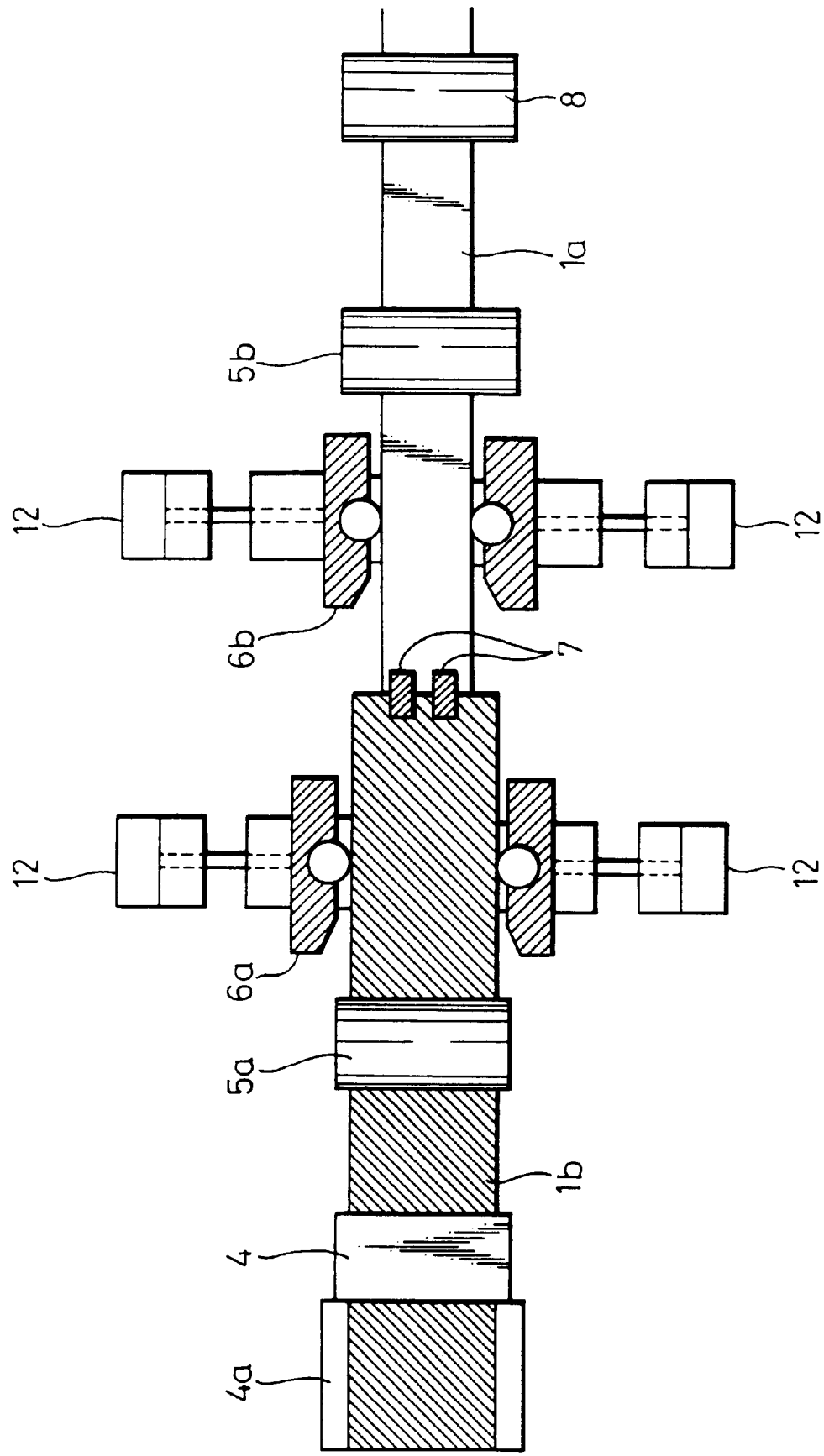
FIG. 2 is a schematic illustration showing an apparatus appropriate for the butt welding method according to the present invention.

As illustrated in FIG. 2, the hydraulic side guides having rotational rollers are constructed in such a manner that the preceding and succeeding sheet bars are independently held at the center of the rolling mill. After the top of the succeeding sheet bar 1b has passed through the entry side pinch roller 5a, the entry side guide roller 6a conducts centering on the succeeding sheet bar with a predetermined pressure so that the succeeding sheet bar can ba placed at the center of the rolling mill, and then the top of the succeeding sheet bar is butted against the tail of the preceding sheet bar 1a. At this time, the preceding sheet bar is independently guided by the delivery side guide roller 6b so that the preceding sheet bar can be positioned at the center of the finishing mill. Even when the width of the preceding sheet bar is different from that of the succeeding sheet bar, they can be held at the center of the rolling mill and butted with accuracy. At this time, the sheet bars are held by the pinch rollers, so that they are prevented from rising when they are butted together.

As described above, at least two pairs of pinch rollers are disposed between the flying shear for cutting the end of the sheet bar and the rolling mill, and a force is applied which is not so high as that applied in the pressure welding system but the force is approximately the same as that applied by a common finishing descaling pinch roller, so that the sheet bar can be prevented by the force from rising during the butting operation. At the same time, the hydraulic side guides having rotational rollers hold the preceding and succeeding sheet bars at the center of the rolling mill so that the sheet bars are guided in the width direction. Therefore, the sheet bar can be squarely cut and butted with high accuracy, and further the butted condition can be maintained.

In this case, the hydraulic side guides are provided with the rotational rollers, however, parallel side guides having no rotational rollers may be adopted and the same effect can be provided. In the case where the parallel side guides having no rotational rollers are used, the length of the apparatus is disadvantageously increased since interference is made with an end portion of the width of the sheet bar.

According to the present invention, in order to respond quickly when the width of the preceding sheet bar is different from that of the succeeding sheet bar, hydraulic side guides capable of responding quickly are adopted. The stroke of the hydraulic cylinder 6C may be determined so that the entire width of the sheet bar can be covered. However, the maximum difference between the width of the preceding sheet bar and that of the succeeding sheet bar may be restricted in the case of the hydraulic cylinder, and an electric type width setting mechanism may be used together with the hydraulic cylinder when the difference between the width of the preceding sheet bar and that of the succeeding sheet bar is very large.

Figure 12A:
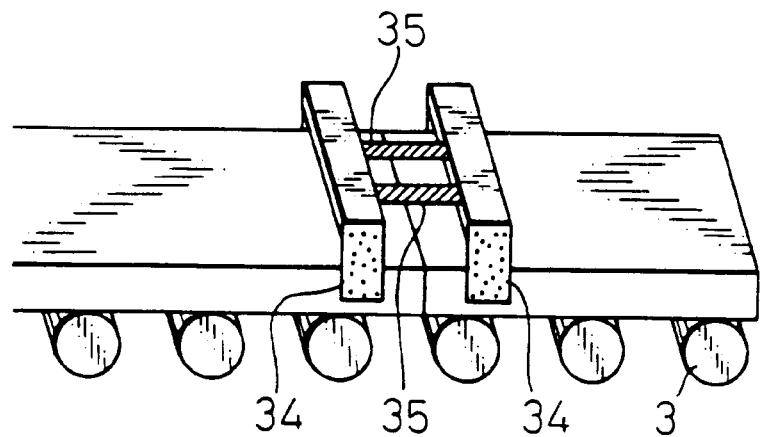
Figure 12B:
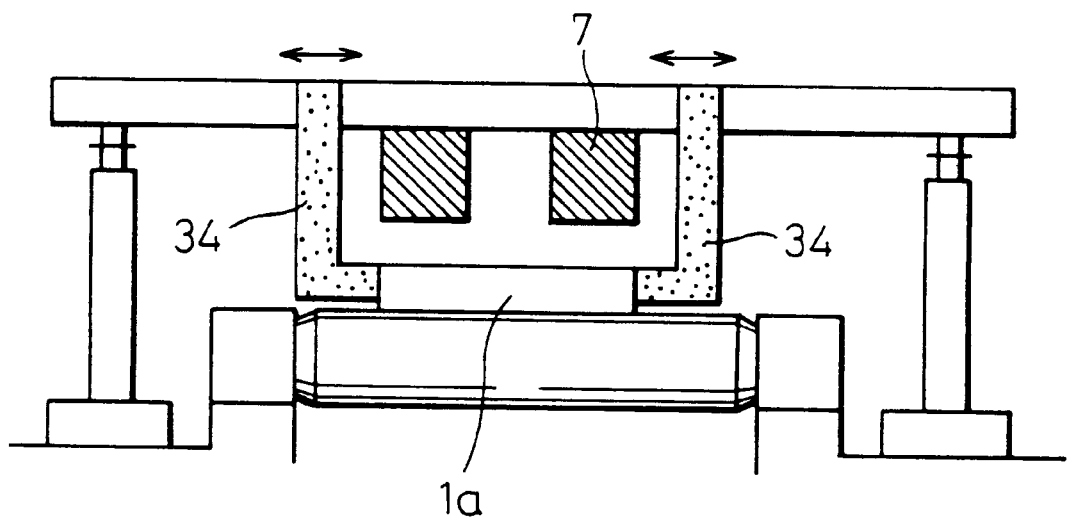

In the present invention, a method of butting sheet bars shown in FIGS. 12(a) and 12(b) may be adopted for preventing the interference with the table 3. FIG. 12(a) is a perspective view, and FIG. 12(b) is a front view showing the method. According to this method, there are provided a clamper 34 and a pushing device 35 connecting with the damper 34. The damper 34 and pushing device 35 are disposed between the flying shear 4 for cutting the ends of the sheet bars 1a, 1b and the rolling mill 8, and the damper 34 clamps the sides of the tail of the preceding sheet bar 1a from the upper surface of the sheet bar and also clamps the sides of the top of the succeeding sheet bar 1b. In the case where the succeeding sheet bar 1b approaches the preceding sheet bar 1a to within the range of the stroke of the pushing device 35, the sides of the preceding sheet bar 1a and succeeding sheet bar 1b are clamped by the damper 34 which does not interference with the table 3, and then the preceding sheet bar 1a and succeeding sheet bar 1b are butted by the pushing device 35.

It is necessary for the damper 34 and pushing device 35 to advance at the same speed as that of the sheet bars after the sides of the sheet bars have been clamped. In this case, the damper 34 and pushing device 35 may trace the sheet bars by themselves, or alternatively the damper 34 and pushing device 35 may wait for the sheet bars at a predetermined position, and after the sheet bars have been clamped, they may be moved by the sheet bars. Until the welding operation of the preceding sheet bar 1a and succeeding sheet bar 1b is completed, the butting condition of the sheet bars is maintained by the pushing device 35. After the sheet bars have been welded, the damper 34 is opened so that the sheet bars are released from the clamper, the entire clamping device is withdrawn to a waiting position to wait for the next butting operation. In this connection, since the sheet bars are welded by means of melting welding, a pushing force of the pushing device 35 is determined to be a value at which a gap necessary for welding can be maintained. Therefore, the pushing force is set to be lower than 2.0 kgf/mm$^2$, and preferably the pushing force is set to be approximately 0.5 kgf/mm$^2$. When the pushing force determined in this manner is applied to the sheet bars, burrs are not caused. Portions of the damper 34 at which the damper 34 comes into contact with the sheet bars are made of ceramics of which the thermal conductivity is low, so that the heat of the sheet bars can be preserved.

In the present invention, instead of the side damper 34 described above, a clamping method shown in FIGS. 13(a) and 13(b) may be adopted, in which the upper and lower surfaces of the sheet bars at the tail of the preceding sheet bar 1a and the top of the succeeding sheet bar 1b are clamped. Compared with the clamping method of the present invention in which the sides of sheet bars are clamped, the conventional clamping method in which the upper and lower surfaces of sheet bars are clamped is disadvantageous in that a large-scale sinking table must be provided in the conveyance table for preventing interference, so that the construction becomes complicated and expensive. However, according to the present invention, when only several table rollers are replaced with a sinking table 37, it is still possible to clamp the upper and lower surfaces of sheet bars. Therefore, it is possible to simplify the construction and reduce the cost of equipment.

Figure 13A:
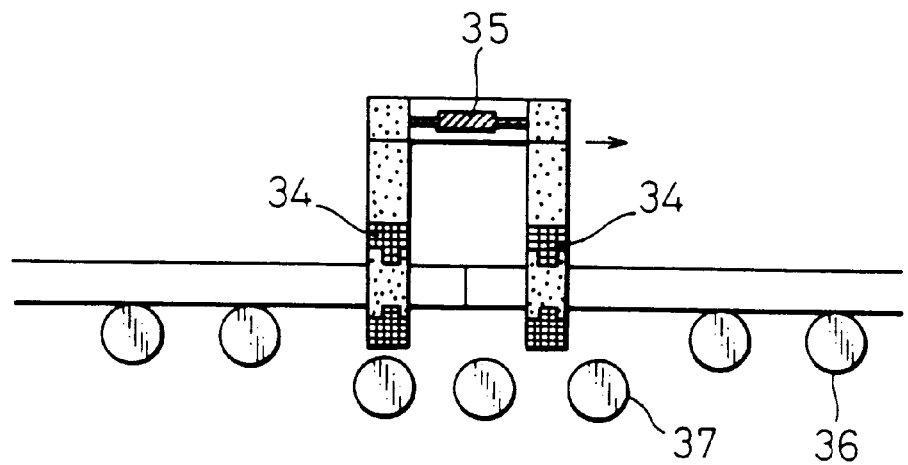
Figure 13B:
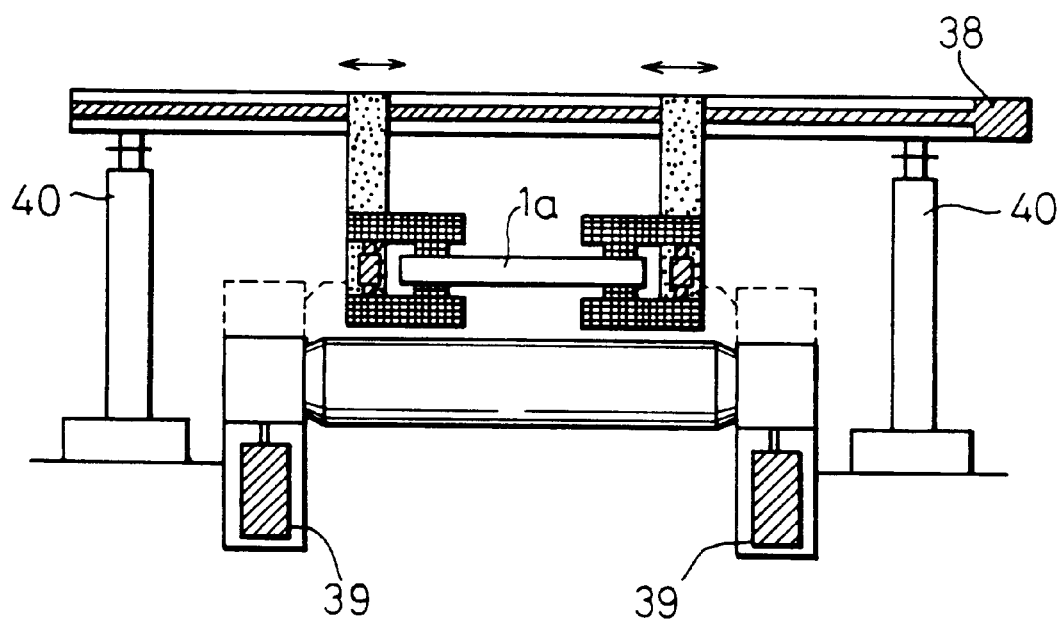

In this connection, according to the method shown in FIGS. 13(a) and 13(b), the damper approaches the sides of sheet bars and clamps the upper and lower surfaces of the sheet bars. However, the present invention is not limited to the above method, but other methods may be adopted, for example, the damper may independently and singly approach the sheet bars from the upside or the downside of the sheet bars.

Compared with the method in which the sides of sheet bars are clamped, this method is disadvantageous in that the construction is complicated and the cost of equipment is increased, because it is necessary to provide a sinking table 37 composed of several rollers in order to prevent interference with the table 3. However, it is possible to adopt this method in spite of the above disadvantages.

Figure 3:
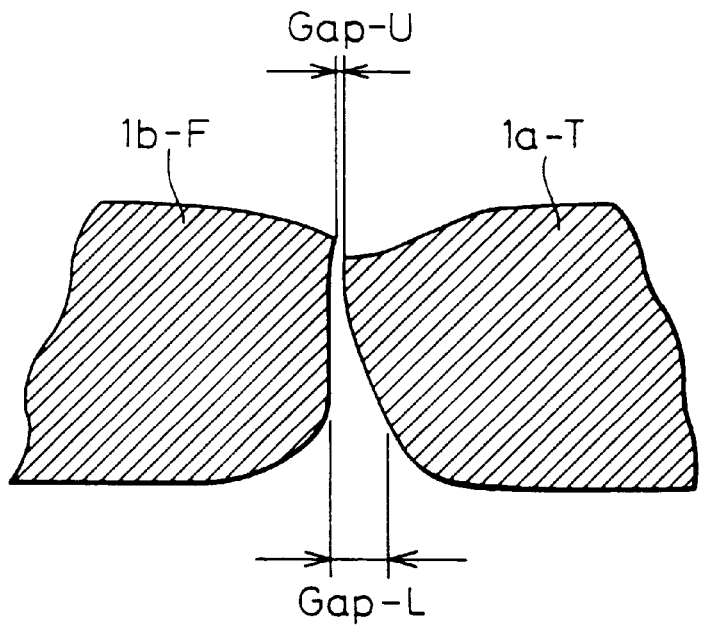
Figure 3:
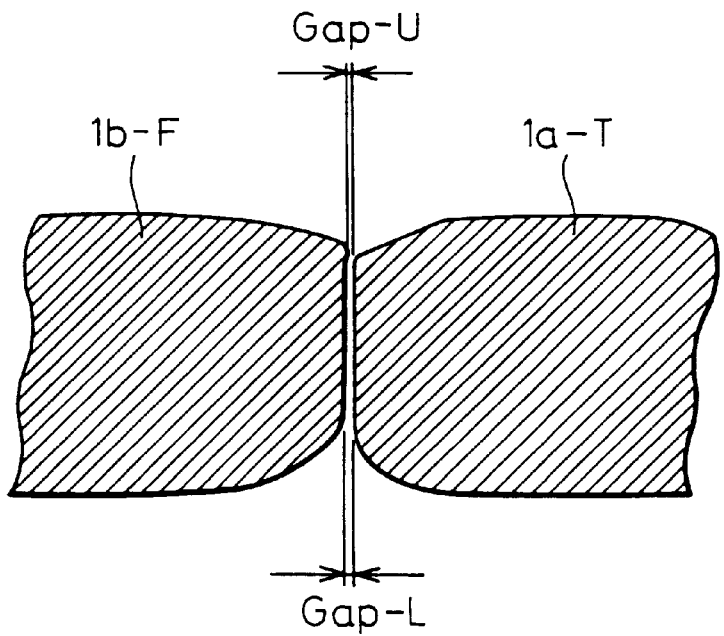

A butted portion of the sheet bar is squarely cut with high accuracy in the width direction. However, the sheet bar is cut by a shear type cutting machine. Therefore, in some cases, sagging occurs at the butted portion of the sheet bars as illustrated in FIG. 3(a). According to the result of a cutting operation conducted by a drum type shear, a gap (Gap-U) in the upper portion of the edge is small, however, in the lower portion of the edge, a gap (Gap-L) is increased large. When the thickness of a slab is 45 to 50 mm, the gap (Gap-L) is increased to approximately 4 mm. In the case of single spot laser beam welding, the laser beam is normally condensed to a diameter not more than 1 mm so as to enhance the energy density, and key-hole welding is conducted in the same manner as a case in which electron beams are used. When the gap is increased to a value not less than 1 mm, the laser beams are not correctly irradiated onto the material and, further, the absorption efficiency is lowered.

Due to the foregoing, welding defects are caused, and further it is necessary to extend a melting portion in the process of welding, so that the welding speed is lowered and welding time is increased. FIG. 3(b) shows a profile of the edge of a slab, the end of which has been cut by laser beams. In this case, the gap (Gap-U) of the upper edge and the gap (Gap-L) of the lower edge become uniform. Even when the slab thickness is 45 to 50 mm, the gap can be kept to less than 1 mm, so that no problems are caused in the laser welding process.

It is an object of laser beam cutting to improve sectional profiles of the sheet bars before the tail of the preceding sheet bar and the top of the succeeding sheet bar are butted. While the laser beam cutting and welding machine 7 is traveling at the same speed as that of the sheet bars, one of or both of the tail of a preceding sheet bar and the top of a succeeding sheet bar are scarfed or cut by the laser beam cutting and welding machine 7 so that protrusions at the butted portion can be scarfed or cut off. After the defective sectional profile has been improved, the sheet bars are butted.

When a pendulum type cutting machine is used, the sheet bar can be squarely cut and the profile shown in FIG. 3(b) can be previously provided. In this case, the aforementioned cutting process may be omitted.

After the preceding and succeeding sheet bars are accurately butted in the width and thickness directions, the welding operation is conducted on the butted portion from the upper surface of the sheet bar by the laser beam cutting and welding machine 7 moving at the same speed as that of the sheet bars. After that, the sheet bars are continuously rolled into a hot strip by a group of finishing mills 8, and the hot strip is cooled in a cooling zone 9 and then cut off by a high speed shear 10 so that the hot strip can be cut into a predetermined length. Then the hot strip is finally wound by a coiler 11.

The laser beam cutting and welding machine 7 cuts and welds the sheet bar while it is traveling. In the case of single spot laser beam welding, the laser beam is normally condensed to a diameter not more than 1 mm so as to enhance the energy density, and key-hole welding is conducted in the same manner as a case in which electron beams are used.

Due to the foregoing, only a limited portion necessary for welding can be deeply heated and melted in the thickness direction of the sheet bar. It is sufficient to weld the sheet bars at both end portions with respect to the width of the sheet bars, the sectional area of the welding portion on one side being not less than 3% of the sectional area of the sheet bar, and the not-welded portion is later joined by the pressure of the first roller stand of the finishing mill. In this way, the sheet bars travel continuously on the rolling line.

Figure 4A:
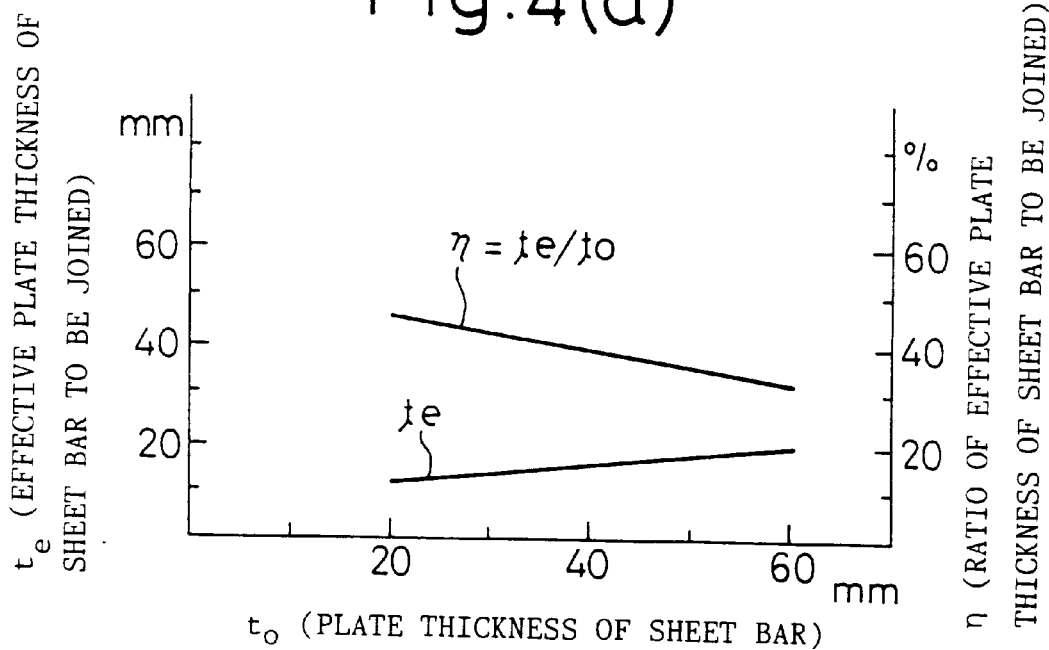
FIG. 4(a) is a graph showing a relation between the thickness of a sheet bar shorn by a flying shear and the effective welding thickness.
Figure 4B:
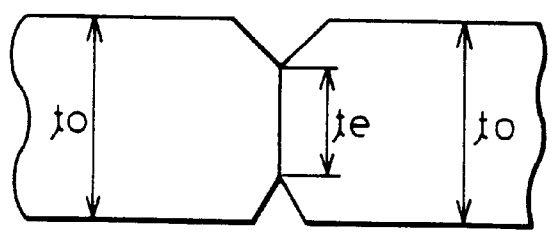
FIG. 4(b) is a view showing the effective welding thickness.
Figure 5:
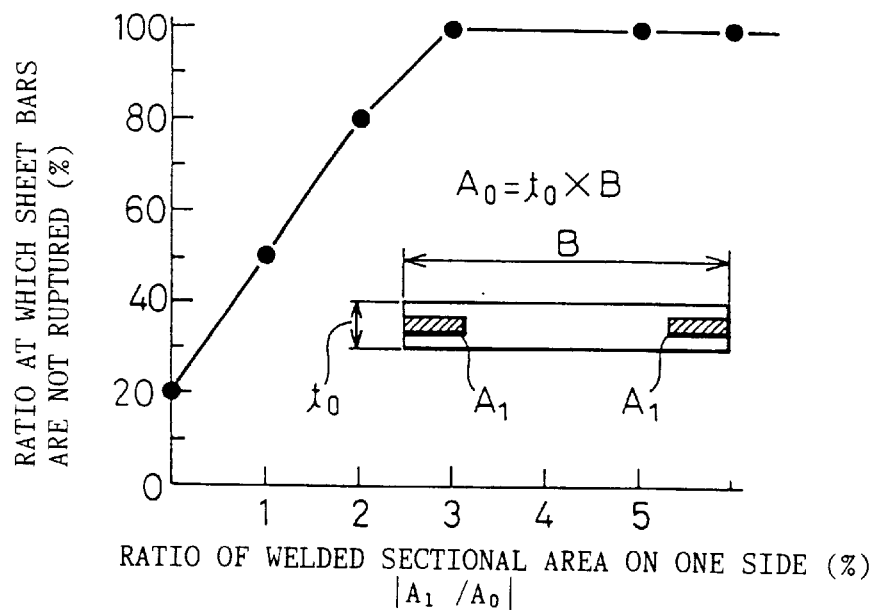
FIG. 5 is a view showing a relation between the ratio of a welded sectional area on one side and the ratio at which sheet bars are not ruptured in the process of continuous hot rolling.

The reason why the welding area is determined to be not less than 3% on one side is described as follows: Since the sheet bars are cut by the flying shear, the effective joining area varies according to the thickness of the sheet bar as shown in FIGS. 4(a) and 4(b). Therefore, it is appropriate that the welding area is used instead of the welding length. FIGS. 4(a) and 4(b) show an example in which a pendulum type shear is used. FIG. 5 shows a ratio of the number of ruptures caused in the finishing mill when the welding sectional area is varied. From the graph shown in FIG. 5, it can be understood that the sheet bars are smoothly rolled by the finishing mill without the occurrence of ruptures when the sectional welding area is not less than 3% on one side.

In this case, the rolling operation is conducted as follows. While the temperatures of the sheet bars are maintained at not less than 900° C., the sheet bars are sent to the first stand of the finishing mill under the condition that the ends of the sheet bars are approximately closely contacted with each other, and they are rolled with a reduction ratio not less than 40%. In this way, the ends of the sheet bars are subjected to pressure welding in the solid phase. Consequently, it is sufficient that the sectional welding area necessary for melting welding satisfies the following conditions:

(1) The sectional welding area can provide a welding strength to bear deflection and bending given to the butted joining portion of the preceding and succeeding sheet bars when the butted joining portion enters the finishing mill.

(2) The extension of the width of the sheet bars is suppressed in the process of finishing rolling, and pressure welding can be smoothly conducted.

Therefore, it is sufficient that the sectional welding area is not less than 3% on one side with respect to the sectional area of the sheet bar. Due to the foregoing, the necessary sectional area can be extremely reduced, and the welding time, which is one of the problems to be solved in the conventional melting welding method, can also be reduced.

Figure 6:
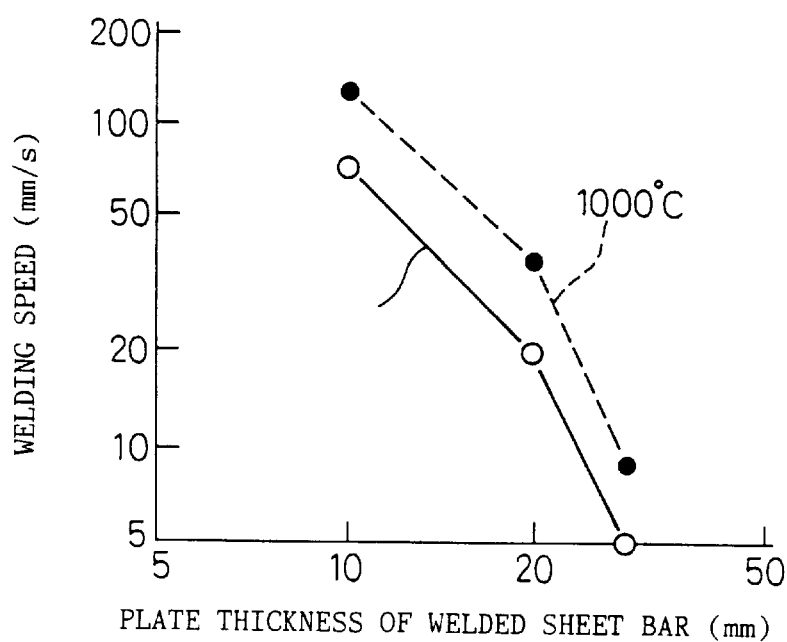
FIG. 6 is a view showing an influence of the welding thickness and temperature on the welding speed.

This joining process will be explained in detail as follows. Even when a laser beam machine having a high capacity, the capacity of which is about 25 kw, is used, the welding speed is only about 20 mm/sec at room temperature when the plate thickness of sheet bars is 20 mm. Therefore, for example, in the case where sheet bars, the width of which is 1980 mm, are welded, it takes the welding time of 99 seconds. When consideration is given to the welding operation in which sheet bars, the maximum width of which is about 60 mm, are welded for the purpose of continuous hot rolling, the required welding time is increased to 900 seconds. Therefore, it is conventionally considered that the above joining method can not be put into practical use. With respect to the above problems, the inventors have found the following:

When consideration is given to a cutting surface of a sheet bar which has been cut by the flying shear, even when the plate thickness of sheet bars is 60 mm, the effective thickness by which the sheet bars can be welded is only about 20 mm. Therefore, the laser beam welding speed can be increased. Further, the actual temperatures of the sheet bars are high and are about 1000° C. Accordingly, it is possible to reduce the heat input compared with a case in which laser beam welding is conducted at room temperature. Consequently, as shown in FIG. 6, it is possible to increase the welding speed to 34 mm/sec, 1.7 times as high as the welding speed at room temperature.

Since the welding speed can be increased to 34 mm/sec and the sectional welding area necessary for continuous rolling is not less than 3% on one side, for example, even when the width of the sheet bar is 1980 mm, it is sufficient that the welding width is 180 mm on one side. For this reason, when two sets of laser beam machines of which the capacity is 25 kW are used, the welding operation can be conducted only in 5.3 seconds.

When technology advances and laser beam machines of a higher capacity become available, the welding time can be further reduced, and the welding operation can be executed by one laser beam machine.

As described above, the effective thickness for laser beam welding is found from a section that has been cut by the flying shear, and also the welding length from the end surface with respect to the width direction is found, and further the welding speed or laser beam output is controlled while consideration is given to the thickness and the temperature of material. Due to the foregoing, the problems of leakage of molten metal and fusion of the sheet bar can be prevented, and joining can be stably carried out.

Welding length $L_1$ on one side from the end surface with respect to the width direction can be found by the following expression.

$$L_1 = C/100 \times W \times t_0/t_e \qquad (1)$$

where C: Ratio of sectional area necessary for joining ($\geq 3\%$ on one side)

W: Width of sheet bar (mm)

$t_0$: Thickness of sheet bar (mm) (shown in FIG. 4(b))

$t_e$: Effective thickness for joining (mm) (shown in FIG. 4(b))

Laser beam welding speed V can be found by the following expression.

$$V = c_1 kW^{c_2}(c_3 + c_4 T^{c_5})/t_e^{c_6} \qquad (2)$$

where V: Laser beam welding speed (mm/sec)

kW: Laser beam output (kW)

T: Temperature of sheet bar (° C.)

$t_e$: Effective plate thickness for joining (mm)

$c_1, c_2, c_3, c_4, c_5, c_6$: Constants

Figure 7:
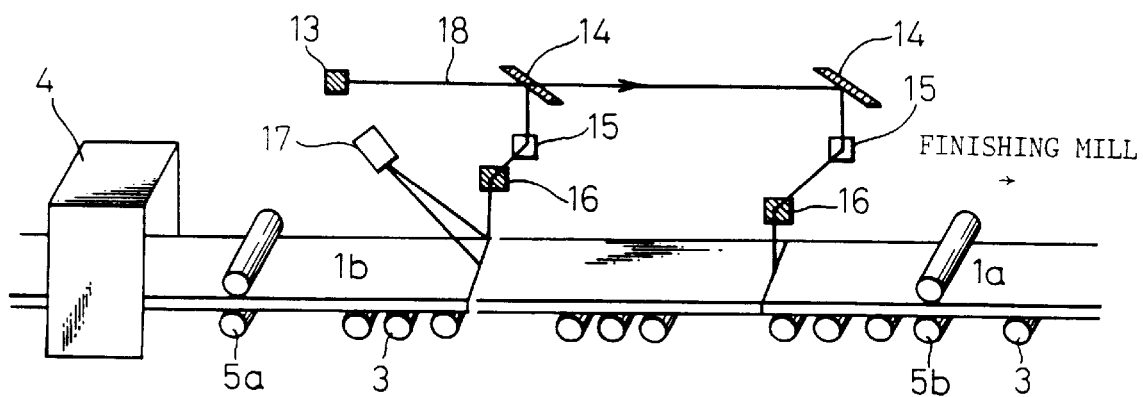
FIG. 7 is a schematic illustration showing an apparatus arrangement appropriate for the flying laser beam welding system to which the present invention is applied.

FIG. 7 shows a welding system for sheet bars in which the laser beam welding apparatus of the present invention is used.

The laser beam welding apparatus includes: a fixed light source 13; a rolling direction movable reflection mirror 14 which receives a laser beam sent from the fixed light source 13 and traces a sheet bar in the rolling direction while moving at the same speed as that of the sheet bar; a vertical direction movable reflection mirror 15 which receives the laser beam and moves in the vertical direction; and a width direction movable condensing mirror system 16 which finally receives the laser beam and joins the sheet bar while moving in the width direction.

Figure 8A:
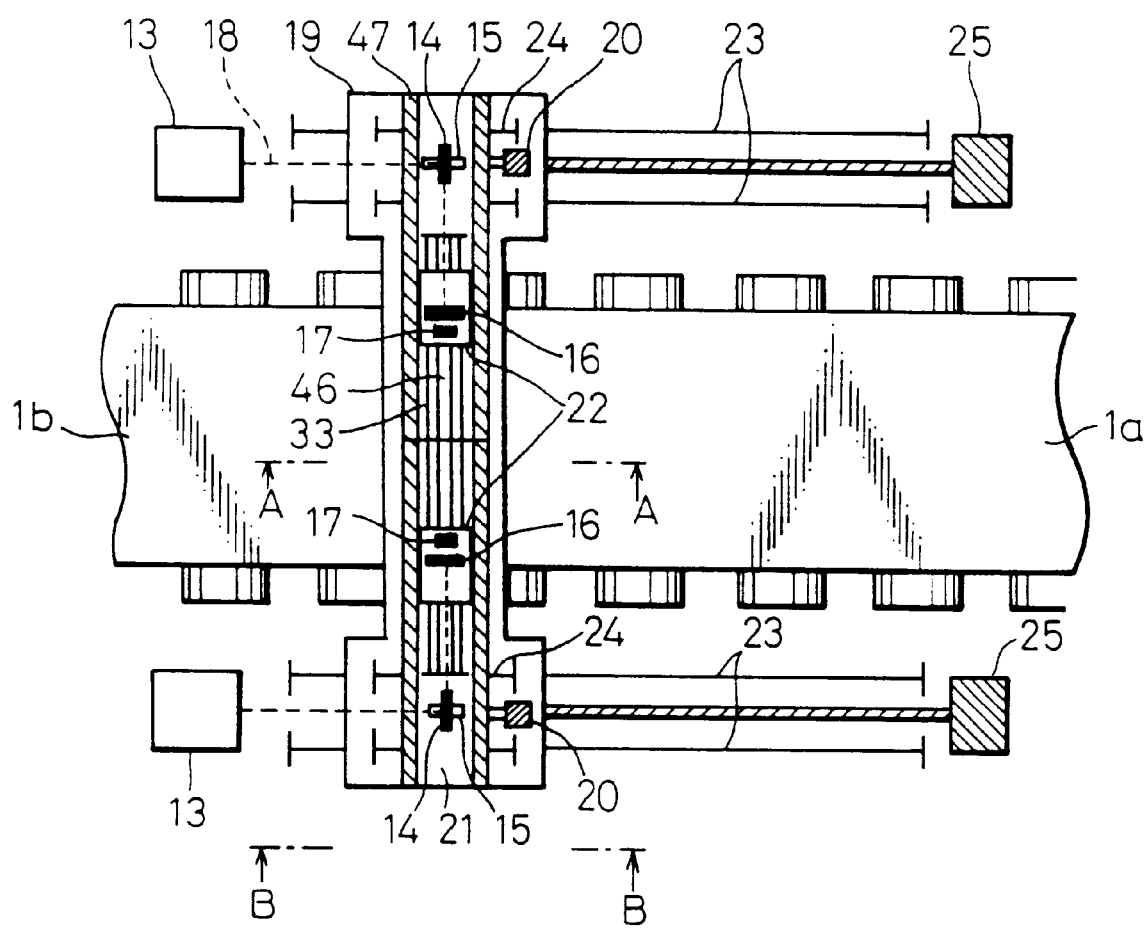
Figure 8B:
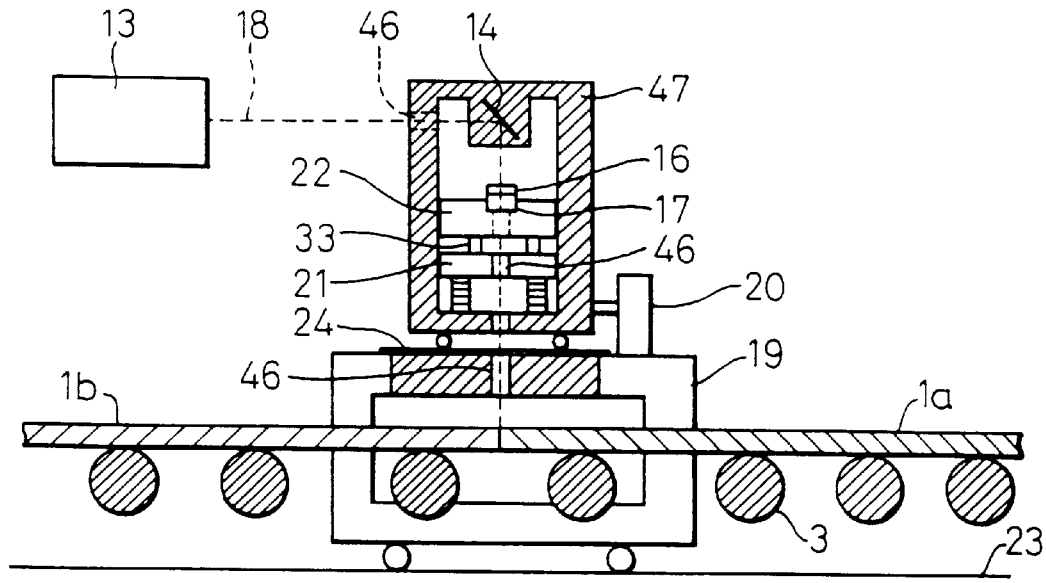
Figure 8C:
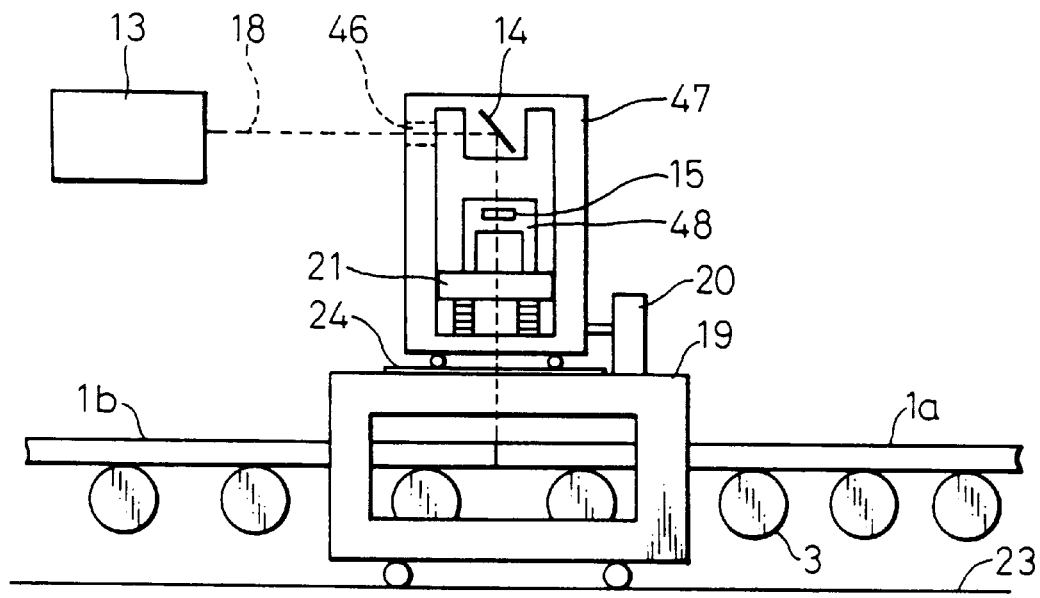

FIGS. 8(a), 8(b) and 8(c) show a primary the construction of the self-advancing type laser beam welding apparatus of the present invention. FIG. 8(a) is a plan view showing the overall construction. FIG. 8(b) is a sectional view taken on line A—A in FIG. 8(a), wherein FIG. 8(b) shows the construction of a carriage of the movable main body traveling device. FIG. 8(c) is a view taken taken on line B—B in FIG. 8(a). The carriage 19 of this movable main body traveling device 19 is constructed in the manner illustrated in FIGS. 8(b) and 8(c). As illustrated in FIG. 8(a), two sets of traveling drive units 25 are provided symmetrically with respect to the width direction of a sheet bar. Therefore, the carriage is capable of traveling at the same speed as that of the sheet bar, and further the movable main body traveling device 19 is constructed in such a manner that the laser beam can be finely adjusted so as to follow a welding line of the sheet bar in the width direction. A width direction traveling unit 22 is placed on a height adjusting unit 21 provided on a fine-adjusting carriage 47. This fine-adjusting carriage 47 can be finely adjusted by a positioning device 20 on the movable main body traveling device 19 in the rolling direction. The construction of the apparatus of the present invention is based on these three carriages.

The fine-adjusting carriage 47 is divided into two portions at the center of a sheet bar, so that the position of each portion of the fine-adjusting carriage 47 can be individually and independently subjected to fine adjustment. Since width direction lateral rails 33 are connected with each other at the center of the sheet bar, any width direction traveling unit 22 is capable of traveling to the other end portion. As shown in FIGS. 8(b) and 8(c), each movable mirror is provided in the following manner: The rolling direction movable reflection mirror 14 is provided at an upper position of the fine-adjusting carriage 47; the vertical direction movable reflection mirror 15 is provided at a lower position of the rolling direction movable reflection mirror 14, that is, the vertical direction movable reflection mirror 15 is provided on a vertical direction movable reflection mirror mount 48 on the height adjusting unit 21; and the width direction movable condensing mirror system 16 is provided on the width direction traveling device 22 at the same height as that of the vertical direction movable reflection mirror 15.

Each movable mirror is positioned with respect to the sheet bar welding position in such a manner that the carriage of the movable main body traveling device 19 travels in the rolling direction and fine adjustment in the rolling direction is conducted by the positioning device 20 so that it is adjusted to the sheet bar joining position. By the height adjusting device 21, the vertical direction movable reflection mirror 15 and the width direction movable condensing mirror system 16 are vertically moved, so that a focal distance can be maintained constant with respect to the sheet bar in the case where the thickness of the sheet bar is changed. In order to traverse the width direction movable condensing mirror system 16 in the width direction of the sheet bar and to detect the sheet bar welding position, a welding section copying device 17 is provided in the width direction traveling device 22 together with the width direction movable condensing mirror system 16.

A laser beam penetrating section 46 for transmitting laser beams is provided between each mirror and the carriage and also between the carriage and the sheet bar. Especially, in the sheet bar width direction traveling section, a slit-shaped laser beam penetrating section 46 is provided.

The welding section copying device 17 is disposed on the movable main body traveling device on the delivery side of the flying shear and detects the butted position of sheet bars. This welding section copying device 17 detects the position where the preceding and succeeding sheet bars have been butted, and also detects both end portions, with respect to the width direction, of the sheet bars to be joined. Due to the foregoing, a coordinate position, to be irradiated with a laser beam, can be determined. First, an end portion of the sheet bar is irradiated with the laser beam, so that the width direction movable condensing mirror system 16 is positioned by the width direction traveling device 22. In accordance with the thickness of a sheet bar, the height adjusting unit 21 is vertically moved so that a focus of the width direction movable condensing mirror system 16 can be adjusted.

Due to the aforementioned construction of the welding apparatus of the present invention, the welding operation is carried out as follows:

Before sheet bars are butted to each other, in order to reduce the gap formed between the butted sheet bars, the tail of the preceding sheet bar and the top of the succeeding sheet bar are preliminarily scarfed or cut off by a laser beam. After that, the top of the succeeding sheet bar, the profile of which is not good, is cut off with respect to the entire width of the sheet bar. In this way, the fluctuation in the gap in the welding section can be reduced, and the effective thickness portion can be maintained in the welding section. After that, the tail of the preceding sheet bar and the top of the succeeding sheet bar are butted by the pinch rollers. At this time, the setting of the laser beam unit is changed to a position where the end portions of sheet bars are welded. After that, welding operation is started from the center of the sheet bar to the end portion with respect to the width direction.

The welding section copying device of the present invention is shown in FIG. 14. This welding section copying device 17 includes two sets of semiconductor laser units 42, and irradiates the welding section with a laser beam of which the wavelength is about 780 nm. The laser beam passes through a band-pass filter 44, the center wavelength of which is the wavelength of the semiconductor laser beam, and the band width of which is several nm. Further the laser beam passes through a lens 43. Then the profile of the laser beam is measured and recognized by a CCD so that the laser beam irradiating position can be detected.

The movable main body traveling device 19 of the laser welding apparatus is accelerated so that the traveling speed of the traveling device 19 can be synchronized with the sheet bar speed measured at an upper idle roller of the pinch roller unit 5a. At the same time, the laser unit is positioned at the sheet bar welding section by the positioning device 20, and laser beam irradiation is started, so that the welding operation is started from the center of the sheet bar to the end portion with respect to the width direction. Even while the traveling device 19 is traveling, the welding section is detected by the welding section copying device 17. In accordance with the thickness and temperature of the sheet bar, and also in accordance with the laser beam output, the traverse speed is varied. In this way, the traverse position of the width direction movable condensing mirror system 16 is controlled until the welding operation is conducted on the welding section at the end of the sheet bar, the sectional area of which is not less than 3% on one side.

In order to obtain a welding sectional area of not less than 3% on one side, wherein the welding sectional area is provided from the end portion to the center of the sheet bar, it is effective that the welding operation is started from the inside of the sheet bar and continued in the direction of the end portion of the sheet bar to the end or to a position close to the end.

After the welding operation has been completed, the movable main body traveling device 19 is withdrawn to a waiting position on the flying shear side so that the movable main body traveling device 19 is prepared for the next welding operation. In order to reduce a period of time necessary for positioning in the width direction, it effective that the setting is roughly conducted beforehand in accordance with the width gauge information provided by a width meter disposed on the delivery side of the roughing mill.

When it is necessary to provide a cutting process before the welding process, it is possible to cut the preceding and succeeding sheet bars approximately in the same manner as that of the welding process described above.

In the case of the laser welding apparatus described above, it is not necessary to move the fixed light source, and the reflection mirror may receive a laser beam sent from the fixed light source and reflect it to the welding section of the sheet bar while the reflection mirror is moved at the same speed as that of the sheet bar. Further, the laser beam is reflected from an upper surface of the conveyance table, so that the occurrence of interference can be avoided. Therefore, the apparatus of the invention can be easily assembled to a rolling line that has already been established.

Figure 9:
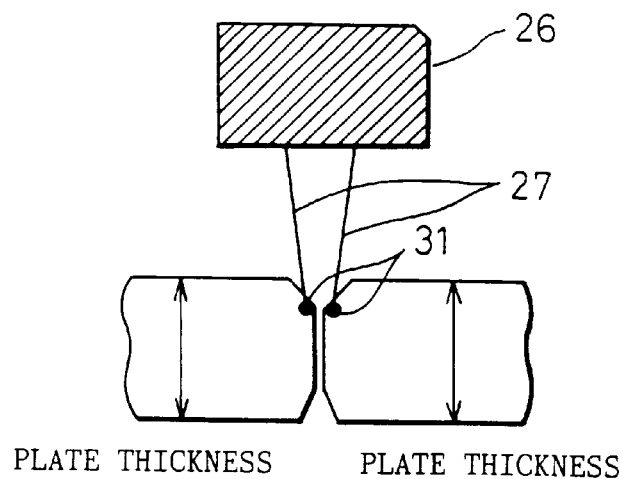
FIG. 9 is a schematic illustration of the plural laser beam welding system to which the present invention is applied.

FIG. 9 is a view showing a method by which the sheet bar butting accuracy can be enhanced when a plurality of laser beams are applied. In the case where a single spot type laser beam is used, when a groove condition of the butted portion is not good, the laser beam does not irradiate the sheet bar but passes through it, so that filler wires must be used in the groove.

The present method is to solve the above problems. According to this method, welding is conducted on the welding section in such a manner that:

both the preceding and succeeding sheet bars are simultaneously irradiated with a plurality of laser beams, so that the gap can be filled with molten metal. In this way, joining is carried out and the entire joining section is welded.

Due to the foregoing, the butting accuracy can be greatly enhanced, and the preceding and succeeding sheet bars can be stably welded without using filler wires. Depending on the circumstances, it is possible to use filler wires.

Figure 10:
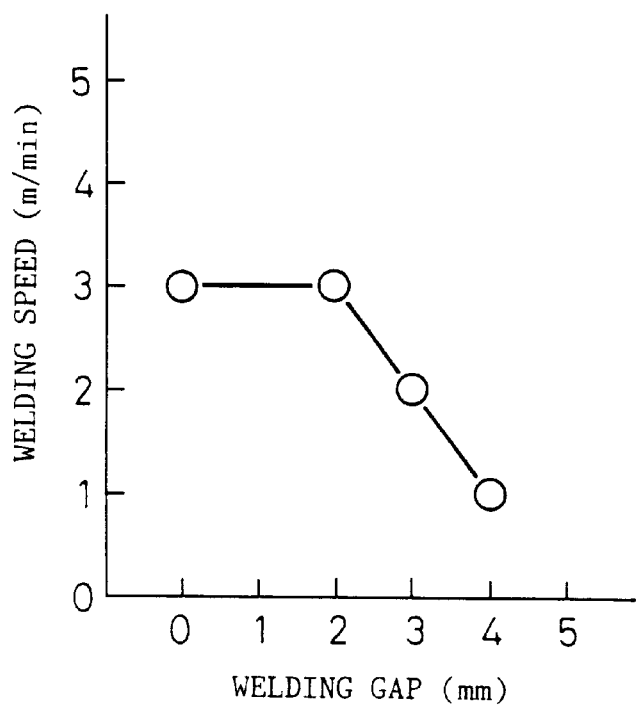
FIG. 10 is a view showing a relation between the welding speed and the welding gap of laser beam welding to which the present invention is applied.

FIG. 10 is a graph showing the effect of this system to which a plurality of laser beams are applied. According to this method, a laser beam of 45 KW is divided into two so that two laser beams are provided. Sheet bars at room temperature, 15.0 mm thick, are butted without using filler wires. In this case, even when the gap in the butted portion is extended to 2 mm, welding can be conducted at the same welding speed as that of a case in which the gap in the butted portion is 0 mm. However, when a comparison is made between this method and the method of the single spot system, the energy density per beam is reduced to half. Therefore, it is necessary to double the laser beam capacity in order to obtain the necessary welding thickness.

FIG. 11 shows a method in which an allowable range of butting accuracy can be extended when the laser beam of the present invention is oscillated by a hydraulic servo mechanism at a frequency of about 60 Hz. As described before, in the case of the single spot system in which the laser beam is not oscillated, filler wires must be used. According to the present invention, a laser beam is oscillated in a direction perpendicular to the parallel groove surface including the welding line, at an amplitude not less than the maximum gap formed in the groove. When both sides of the sheet bar is irradiated with the laser beam described above, the sheet bars are positively joined, and the allowable range of butting accuracy can be greatly improved.

In the case where a necessary frequency can not be provided, it is effective to oscillate the focus mirror. In the case where a sectional area of the joining section is not sufficient, it is possible to add filler wires.

As described above, according to the present invention, when a laser beam welding method or a plasma arc welding method is applied to the welding of preceding and succeeding sheet bars, it is not necessary to impress a high pressure (not less than 3 $kgf/mm^2$) unlike pressure welding. Therefore, the preceding and succeeding sheet bars may be positioned by a pressure lower than 2.0 $kgf/mm^2$ which is the same as that of a finishing descaling pinch roller of the conventional mill, wherein the occurrence of scale marks can be avoided when the pressure of 2.0 $kgf/mm^2$ is applied onto the surface of sheet bars. It is preferable that the preceding and succeeding sheet bars are positioned by a pressure of about 0.5 $kgf/rnm^2$. Therefore, this joining method causes no problems in quality.

According to this melting welding method, only a portion necessary for joining is locally melted and welded. Therefore, splashes are not caused, and burrs that can be seen in pressure welding are not caused, either. In addition to the above advantages in quality, it is not necessary to remove splashes and burrs, so that the efficiency of this welding method can be enhanced. Accordingly, the joining time can be reduced, and the length of the welding apparatus can be reduced.

It is necessary that the welded portion is coagulated and a predetermined mechanical strength is provided before the welded portion enters the first finishing stand. In general, the temperature of a sheet bar is about 1000° C. Therefore, it takes time for the welded portion to be coagulated in the case of a melting welding method such as a thermit welding method in which a large amount of heat is inputted. Accordingly, the length of the apparatus is extended. On the other hand, according to the welding method of the present invention, an amount of heat to be inputted into the welded portion can be reduced, so that a sufficient mechanical strength can be provided even when the length of the apparatus is short. When necessary, the welded portion may be cooled by air or cooling water, so that the length of the apparatus can be further reduced.

When the welding methods of a laser beam welding and plasma arc welding are adopted, in which a heat source with a high energy density is used, a sheet bar can be heated, melted and welded in the thickness direction when the sheet bar is only heated from the upper surface. Therefore, it is not necessary to provide an apparatus on lower side of the sheet bar. Accordingly, a large-scale expensive apparatus such as a swing roller group is not required, and it is possible to use a common table roller group.

With reference to an example, the present invention will be further explained as follows.

EXAMPLES

Example 1

Slabs were heated by a heating furnace. They were then rolled by a roughing mill so that sheet bars, the plate thickness of which was 60 mm, the width of which was 1980 mm, and the temperature of which was 1000° C. were provided. The tail of a preceding sheet bar and the top of a succeeding sheet bar, which were traveling at a speed of 100 mpm, were respectively cut by a pendulum type shear so that the profiles of the ends were trimmed. Then, using two sets of laser beam welding machines, the capacity of each welding machine was 25 kW and the welding speed was 34 mm/sec, welding was conducted on both end portions of the sheet bars from the upper surface, so that the end portions were respectively welded from an end of the sheet bar to a position distant from the end by 180 mm. In this case, the ratio of the sectional area of the joined portion on one side was 3%. After that, the welded sheet bars were rolled by the first finishing mill at a reduction ratio of 40%.

According to the result of an investigation, a butted portion that was not subjected to laser beam welding was joined with pressure by the first finishing mill in the process of continuous hot rolling. Therefore, a total area of the joined portion including the portion welded by laser beam welding was not less than 75%. Under the above condition, the sheet bars were subjected to continuous hot rolling by the following finishing mills, and a product of 6 mm thickness was provided. As a result, no rupture was caused in the process of rolling. In this connection, the traveling distance of the laser beam reflection mirror was 10 m in the rolling direction including the distance required for accelerating and decelerating the welding apparatus.

Example 2

In the same manner as Example 1, the operation was conducted as follows. Slabs were heated by a heating furnace. Then they were rolled by a roughing mill so that sheet bars, the plate thickness of which was 40 mm, the width of which was 1550 mm, and the temperature of which was 1050° C. were provided. The tail of a preceding sheet bar and the top of a succeeding sheet bar, which were traveling at a speed of 50 mpm, were welded by two sets of laser beam welding machines, the capacity of each welding machine was 25 kW and the welding speed was 59 mm/sec, and welding was conducted on both end portions of the sheet bars from the upper surface, so that the end portions were respectively welded from an end of the sheet bar to a position distant from the end by 320 mm. In this case, a ratio of the sectional area of the joined portion on one side to the total area was 8%. Under the above condition, the sheet bars were subjected to continuous hot rolling by the following finishing mills, and a product of 2.0 mm thickness was provided. As a result, no rupture was caused in the process of continuous hot rolling. In this connection, a traveling distance of the laser beam reflection mirror was 4.9 m in the rolling direction including the distance required for accelerating and decelerating the welding apparatus.

Example 3

In the same manner as Example 1, the operation was conducted as follows. Slabs were heated by a heating furnace. Then they were rolled by a roughing mill so that sheet bars, the plate thickness of which was 25 mm, the width of which was 1200 mm, and the temperature of which was 1080° C. were provided. The tail of a preceding sheet bar and the top of a succeeding sheet bar, which were traveling at a speed of 48 mpm, were welded by two sets of laser beam welding machines, the capacity of each welding machine was 25 kW and the cutting speed was 200 mm/sec and the welding speed was 100 mm/sec, and the welding was conducted on both end portions of the sheet bars from the upper surface, so that the end portions were respectively welded from an end of the sheet bar to a position distant from the end by 600 mm. In this case, a ratio of the sectional area of the joined portion on one side to the total area was 23%. Under the above condition, the sheet bars were subjected to continuous hot rolling by the following finishing mills, and a product of 1.2 mm thickness was provided. As a result, no rupture was caused in the process of rolling.

In this connection, a traveling distance of the laser beam reflection mirror was 6.5 m in the rolling direction including the distance required for accelerating and decelerating the joining apparatus.

As can be seen from the above examples, the present invention is to provide a method of joining a rough-rolled succeeding sheet bar with a preceding sheet bar that is being subjected to finish rolling, by means of laser beam or plasma arc melting welding and without stopping the sheet bar on the rolling line, so that the sheet bars are effectively joined by the welding operation conducted from the upper surface of the sheet bars. Therefore, the distance required for joining is very short as shown in the examples. Further, as the joining operation is conducted from the upper surface of the sheet bars, no interference is caused between the welding apparatus and the sheet bar conveyance table. Therefore, the method of the invention can be economically applied to an existing rolling line.

According to the present invention, it is possible to prevent the occurrence of defects on the surface of a product caused by burrs at the joining section, and also it is possible to prevent the occurrence of scale marks caused when the surface of a sheet bar is strongly pressed. Therefore, a hot strip of high quality can be obtained. According to the present invention, improvements in productivity and quality can be ensured when sheet bars are subjected to continuous finish rolling.

We claim:

1. A continuous hot rolling method in which the tail of a preceding sheet bar and the top of a succeeding sheet bar are butted and then welded and then the welded sheet bars are continuously hot rolled, comprising the steps of:

continuously moving a preceding sheet bar and a succeeding sheet bar in a hot rolling direction at a predetermined hot rolling speed, wherein each sheet bar has a thickness of 20 to 60 mm and a temperature of not less than 900° C.;

butting the tail of the preceding sheet bar to the top of the succeeding sheet bar with a pushing force set to be lower than 2.0 kqf/mm$^2$;

conducting a laser beam melting welding operation on the butted continuously moving preceding sheet bar and succeeding sheet bar at the butted portion with a welding machine from the upper surfaces of the sheet bars using laser beams, said butted portion defining a welding line transverse to the hot rolling direction, and said welding machine including a laser beam focusing unit movably mounted on said welding machine for movement transverse to the hot rolling direction;

moving the welding machine itself in the hot rolling direction at the same speed as that of the continuously moving butted sheet bars while the melting welding operation is being conducted;

determining laser beam output and welding speed from the temperature of the sheet bar;

moving said laser beam focusing unit transverse to said hot rolling direction and parallel to said welding line simultaneously with said moving of said welding machine in said hot rolling direction, said transverse moving laser beam focusing unit focusing laser beams on said welding line thereby causing said melting welding operation;

hot rolling the continuously moving welded sheet bars.

2. The continuous hot rolling method according to claim 1, said method further comprising the steps of: holding the sheet bars by at least 2 pairs of pinch rollers disposed between a flying shear for cutting an end of the sheet bar and said hot rolling mill; and holding the preceding and succeeding sheet bars independently at a center of the rolling mill by a hydraulic side guide disposed between the pairs of pinch rollers.

3. The continuous hot rolling method according to claim 1, said method further comprising the step of: butting the preceding and succeeding sheet bars while the side of the tail of the preceding sheet bar and the side of the top of the succeeding sheet bar are respectively clamped by a clamper connected with a pushing device, said clamper being disposed between a flying shear for cutting an end of the sheet bar and the rolling mill, said clamping operation being conducted from the upper side of the sheet bar, said butting operation being conducted at the same speed as that of the sheet bar.

4. The continuous hot rolling method according to claim 1, said method further comprising the step of: butting the preceding and succeeding sheet bars while the upper and lower surfaces of the tail of the preceding sheet bar and the top of the succeeding sheet bar are respectively clamped by a clamper connected with a pushing device, said clamper being disposed between the flying shear for cutting an end of the sheet bar and the rolling mill, said butting operation being conducted at the same speed as that of the sheet bar.

5. The continuous hot rolling method according to claim 1, said method further comprising the step of: preliminarily forming one of or both of the tail of the preceding sheet bar and the top of the succeeding sheet bar before the sheet bars are butted so that a gap formed in the butted portion can be reduced, wherein the preliminary formation is conducted from an upper surface of the sheet bar by means of laser beam scarfing or cutting at the same speed as that of the sheet bar.

6. The continuous hot rolling method according to claim 1, said method further comprising the steps of: welding the sheet bars at both end portions with respect is to the width of the sheet bars, a sectional area of the welding portion on one side being not less than 3% of the sectional area of the sheet bar; and joining the not-welded portion, with pressure, by the first roller stand of the mill.

7. The continuous hot rolling method according to claim 1, said method further comprising the step of: determining the welding length in the width direction of the sheet bar from the effective thickness of the butted portion of which the surfaces are formed by means of shear cutting or laser beam cutting.

8. A continuous hot rolling method in which the tail of a preceding sheet bar and the top of a succeeding sheet bar are butted and then welded and then the welded sheet bars are continuously hot rolled, comprising the steps of:

continuously moving a preceding sheet bar and a succeeding sheet bar in a hot rolling direction at a predetermined hot rolling speed, wherein each sheet bar has a thickness of 20 to 60 mm and a temperature of not less than 900° C.;

butting the tail of the preceding sheet bar to the top of the succeeding sheet bar;

conducting a laser beam melting welding operation on the butted continuously moving preceding sheet bar and succeeding sheet bar at the butted portion with a welding machine under conditions of said welding operation, wherein a sectional area of a welding portion on one side is not less than 3% of a sectional area of said sheet bar, a pushing force is set to be lower than 2.0 kgf/mm$^2$, and subsequently ends of said sheet bars are subjected to pressure welding in a solid phase by rolling said welding portion with a reduction ratio not less than 40%;

moving the welding machine itself in the hot rolling direction at the same speed as that of the continuously moving butted sheet bars while the melting welding operation is being conducted; and hot rolling the continuously moving welded sheet bars.

9. The continuous hot rolling method according to claim 8, said method further comprising the step of: determining a welding speed of the sheet bar from the temperature of the sheet bar, laser beam output, and targeted welding plate thickness.

10. The continuous hot rolling method according to claims 1, said method further comprising the step of: simultaneously irradiating a plurality of laser beams on both the tail of a preceding sheet bar and the top of a succeeding sheet bar so as to melt them for enhancing the dimensional accuracy of the butted portion.

11. A continuous hot rolling method in which the tail of a preceding sheet bar and the top of a succeeding sheet bar are butted and then welded and then the welded sheet bars are continuously hot rolled, comprising the steps of:

continuously moving a preceding sheet bar and a succeeding sheet bar in a hot rolling direction at a predetermined hot rolling speed, wherein each sheet bar has a thickness of 20 to 60 mm and a temperature of not less than 900° C.;

butting the tail of the preceding sheet bar to the top of the succeeding sheet bar with a pushing force set to be lower than 2.0 kqf/mm$^2$;

conducting a laser beam melting welding operation on the butted continuously moving preceding sheet bar and succeeding sheet bar at the butted portion with a welding machine under conditions of said welding operation, wherein said laser beam output (kw), said welding speed (v) and said temperature of said sheet bar (T) satisfy a relationship $v \geq C1 \cdot kw^{C2} \cdot (C3 + C4 \cdot T^{C5})/te^{C6}$, where te is effective plate thickness for joining (mm) and C1, C2, C3, C4, C5 and C6 are constants;

moving the welding machine itself in the hot rolling direction at the same speed as that of the continuously moving butted sheet bars while the melting welding operation is being conducted; and hot rolling the continuously moving welded sheet bars.

12. A continuous hot rolling method in which the tail of a preceding sheet bar and the top of a succeeding sheet bar are butted and then welded and then the welded sheet bars are continuously hot rolled, comprising the steps of:

continuously moving a preceding sheet bar and a succeeding sheet bar in a hot rolling direction at a predetermined hot rolling speed, wherein each sheet bar has a thickness of 20 to 60 mm and a temperature of not less than 900° C.;

butting the tail of the preceding sheet bar to the top of th e succeeding sheet bar;

conducting a laser beam melting welding operation on the butted continuously moving preceding sheet bar and succeeding sheet bar at the butted portion with a welding machine under conditions of said welding operation, wherein said laser beam output (kw), said welding speed (v) and said temperature of said sheet bar (T) satisfy a relationship $v \geq C1 \cdot kw^{C2} \cdot (C3 + C4 \cdot T^{C5})/te^{C6}$, where te is effective plate thickness for joining (mm) and C1, C2, C3, C4, C5 and C6 are constants; and further a sectional area of a welding portion on one side is not less than 3% of a sectional area of said sheet bar, a pushing force is set to be lower than 2.0 kgf/mm², and subsequently ends of said sheet bars are subjected to pressure welding in a solid phase by rolling said welding portion with a reduction ratio not less than 40%;

moving the welding machine itself in the hot rolling direction at the same speed as that of the continuously moving butted sheet bars while the melting welding operation is being conducted; and hot rolling the continuously moving welded sheet bars.

* * * * *

UNITED STATES PATENT AND TRADEMARK OFFICE
CERTIFICATE OF CORRECTION

PATENT NO. : 5,994,665
DATED : November 30, 1999
INVENTOR(S) : Shigeru NISHIBAYASHI, et al.

It is certified that error appears in the above-identified patent and that said Letters Patent is hereby corrected as shown below:

Column 3, line 30, change "damper" to –clamper–.

Column 4, line 23, change "damper" to –clamper–.

Column 5, line 40, change "damper" to –clamper–.

Column 5, line 44, change "dampers" to –clampers–.

Column 7, line 20, change "damper" to –clamper– (both occurrences).

Column 7, line 22, change "damper" to –clamper–.

Column 7, line 29, change "damper" to –clamper–.

Column 7, line 33, change "damper" to –clamper–.

Column 7, line 36, change "damper" to –clamper–.

Column 7, line 37, change "damper" to –clamper–.

Column 7, line 44, change "damper" to –clamper–.
Column 7, line 55, change "damper" to –clamper–.

Column 7, line 56, change "damper" to –clamper–.

Column 7, line 59, change "damper" to –clamper–.

UNITED STATES PATENT AND TRADEMARK OFFICE
CERTIFICATE OF CORRECTION

PATENT NO. : 5,994,665
DATED : November 30, 1999
INVENTOR(S) : Shigeru NISHIBAYASHI, et al.

It is certified that error appears in the above-identified patent and that said Letters Patent is hereby corrected as shown below:

Column 8, line 9, change "damper" to –clamper–.

Column 8, line 13, change "damper" to –clamper–.

Column 16, line 49, change "kqf/mm$^2$" to –kgf/mm$^2$–.

Column 17, line 46, delete "is".

Column 18, line 38, change "kqf/mm$^2$" to –kgf/mm$^2$–.

Column 18, line 64 change "th" at end of line to –the–.

Column 18, line 65, delete "e" at beginning of line.

Signed and Sealed this

First Day of May, 2001

Attest:

NICHOLAS P. GODICI

Attesting Officer

Acting Director of the United States Patent and Trademark Office